United States Patent
Onodera

(10) Patent No.: US 12,073,098 B2
(45) Date of Patent: Aug. 27, 2024

(54) MEMORY SYSTEM AND INFORMATION PROCESSING SYSTEM

(71) Applicant: KIOXIA CORPORATION, Tokyo (JP)

(72) Inventor: Takuya Onodera, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 182 days.

(21) Appl. No.: 17/899,547

(22) Filed: Aug. 30, 2022

(65) Prior Publication Data

US 2023/0297254 A1 Sep. 21, 2023

(30) Foreign Application Priority Data

Mar. 18, 2022 (JP) ................................ 2022-044353
Aug. 22, 2022 (JP) ................................ 2022-131713

(51) Int. Cl.
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC ..... G06F 3/0625; G06F 3/0653; G06F 3/0679
See application file for complete search history.

(56) References Cited

U.S. PATENT DOCUMENTS 9,946,481 B2  4/2018  Warriner

*Primary Examiner* — Eric Cardwell
(74) *Attorney, Agent, or Firm* — Kim & Stewart LLP

(57) ABSTRACT

A memory system connectable to an external device that can supply power thereto, includes a non-volatile memory that stores data indicating a plurality of operation modes in association with different power consumption values, and a controller configured to, upon receipt of a first command indicating a first value of the power from the external device, determine a first ratio of execution times of the operation modes, and control the non-volatile memory using the operation modes according to the determined first ratio.

20 Claims, 17 Drawing Sheets

| AVERAGE POWER CONSUMPTION TARGET VALUE [mW] | STAY TIME RATIO $T_A$ OF OPERATION MODE A | STAY TIME RATIO $T_B$ OF OPERATION MODE B | STAY TIME RATIO $T_C$ OF OPERATION MODE C | STAY TIME RATIO $T_D$ OF OPERATION MODE D |
|---|---|---|---|---|
| 10000≦P | 1 | 0 | 0 | 0 |
| 6000≦P<10000 | 1-(10000-P)/4000 | (10000-P)/4000 | 0 | 0 |
| 2300≦P<6000 | 0 | 1-(6000-P)/3700 | (6000-P)/3700 | 0 |
| 500≦P<2300 | 0 | 0 | 1-(2300-P)/1800 | (2300-P)/1800 |
| P<500 | — | — | — | — |

| OPERATION MODE | OPERATION SPEED [MB/s] | AVERAGE POWER CONSUMPTION [mW] |
|---|---|---|
| A | 120 | 10000 |
| B | 80 | 6000 |
| C | 30 | 2300 |
| D | 5 | 500 |

FIG. 3

| AVERAGE POWER CONSUMPTION TARGET VALUE [mW] | STAY TIME RATIO $T_A$ OF OPERATION MODE A | STAY TIME RATIO $T_B$ OF OPERATION MODE B | STAY TIME RATIO $T_C$ OF OPERATION MODE C | STAY TIME RATIO $T_D$ OF OPERATION MODE D |
|---|---|---|---|---|
| 10000≦P | 1 | 0 | 0 | 0 |
| 6000≦P<10000 | 1-(10000-P)/4000 | (10000-P)/4000 | 0 | 0 |
| 2300≦P<6000 | 0 | 1-(6000-P)/3700 | (6000-P)/3700 | 0 |
| 500≦P<2300 | 0 | 0 | 1-(2300-P)/1800 | (2300-P)/1800 |
| P<500 | — | — | — | — |

| USAGE MODE | POWER SUPPLY CAPACITY | COOLING CAPACITY | MAXIMUM POWER RATING SETTING VALUE |
|---|---|---|---|
| DESKTOP PC | TO 100W | HIGH | 100W |
| NOTEBOOK PC | TO 10W | SLIGHTLY HIGH | 3 TO 10W |
| SMART PHONE | TO 3W | SLIGHTLY LOW | 1 TO 3W |
| USB STORAGE | TO 100W | LOW | TO 10W |

FIG. 6

| Bit / Byte | Bit 7 | Bit 6 | Bit 5 | Bit 4 | Bit 3 | Bit 2 | Bit 1 | Bit 0 |
|---|---|---|---|---|---|---|---|---|
| Byte 0 | SP | SPF(0b) | \multicolumn{6}{l}{Page Code(36h)} | | | | | | |
| Byte 1 | \multicolumn{8}{l}{Page Length(10h)} | | | | | | | |
| Byte 2 | Pwr_Max_En | \multicolumn{7}{l}{Reserved} | | | | | | | |
| Byte 3 | \multicolumn{8}{l}{Pwr_Max_Conf.} | | | | | | | |
| Byte 4 | | | | | | | | |
| Byte 5 | \multicolumn{8}{l}{Reserved} | | | | | | | |
| ... | | | | | | | | |
| Byte 15 | | | | | | | | |

FIG. 7

| Bit / Byte | Bit 7 | Bit 6 | Bit 5 | Bit 4 | Bit 3 | Bit 2 | Bit 1 | Bit 0 |
|---|---|---|---|---|---|---|---|---|
| Byte 0 | SP | SPF(0b) | Page Code(36h) | | | | | |
| Byte 1 | Page Length(0Eh) | | | | | | | |
| Byte 2 | Pwr_Max_En | Reserved | | | | | | |
| Byte 3 | Pwr_Max_Conf. | | | | | | | |
| Byte 4 | Reserved | | | | | | | |
| Byte 5 | | | | | | | | |
| ... | | | | | | | | |
| Byte 15 | | | | | | | | |

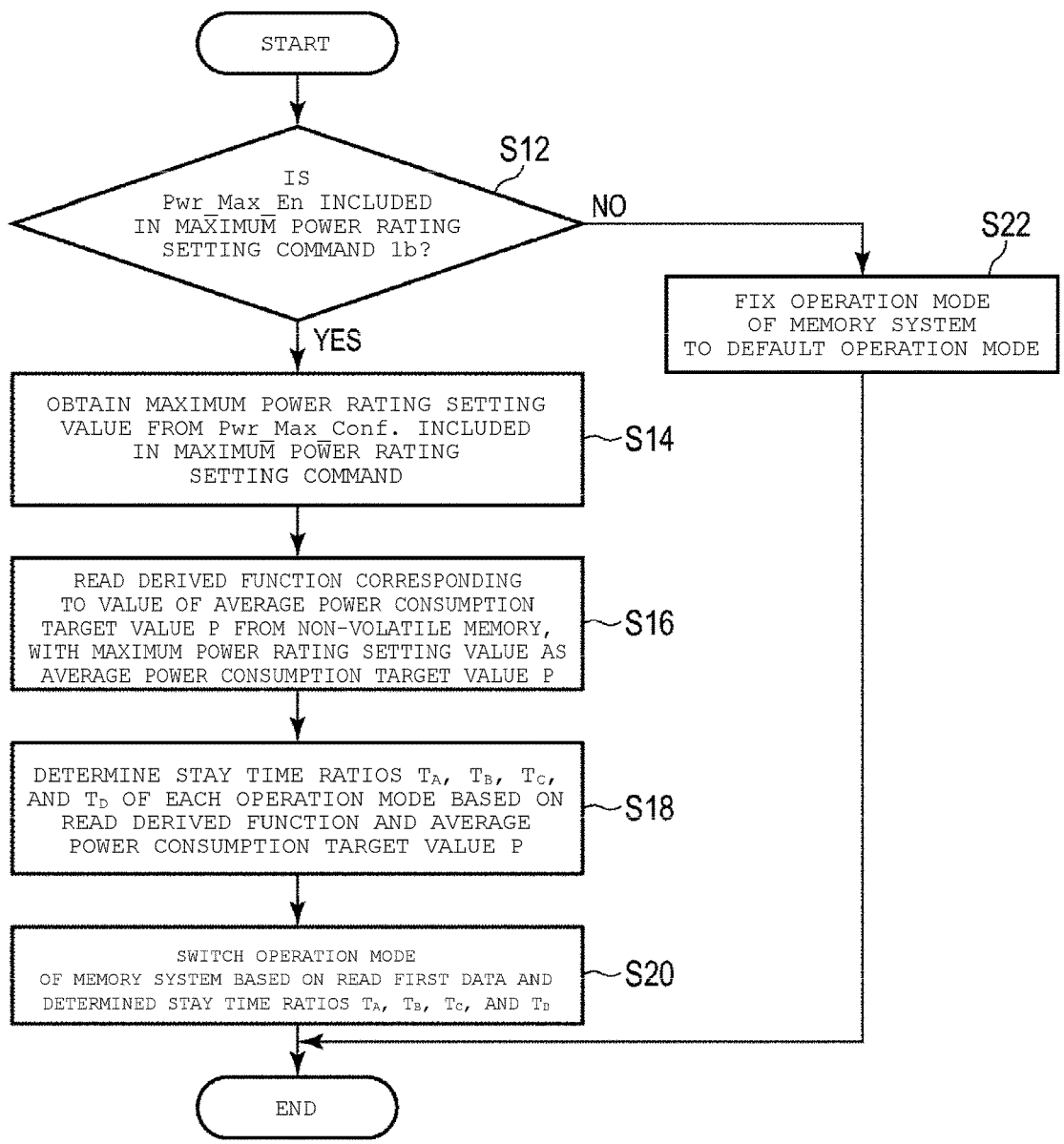

FIG. 10

| Bit<br>Byte | Bit 7 | Bit 6 | Bit 5 | Bit 4 | Bit 3 | Bit 2 | Bit 1 | Bit 0 |
|---|---|---|---|---|---|---|---|---|
| Byte 0 | SP | SPF(0b) | \multicolumn{6}{c\|}{Page Code(37h)} |
| Byte 1 | \multicolumn{8}{c\|}{Page Length(10h)} |
| Byte 2 | Pwr_Ctrl_En | \multicolumn{7}{c\|}{Reserved} |
| Byte 3 | \multicolumn{8}{c\|}{Pwr_Ctrl_Conf.} |
| Byte 4 | \multicolumn{8}{c\|}{} |
| Byte 5 | \multicolumn{8}{c\|}{Reserved} |
| ... | \multicolumn{8}{c\|}{} |
| Byte 15 | \multicolumn{8}{c\|}{} |

FIG. 11

| Bit / Byte | Bit 7 | Bit 6 | Bit 5 | Bit 4 | Bit 3 | Bit 2 | Bit 1 | Bit 0 |
|---|---|---|---|---|---|---|---|---|
| Byte 0 | SP | SPF(0b) | Page Code(37h) | | | | | |
| Byte 1 | Page Length(0Eh) | | | | | | | |
| Byte 2 | Pwr_Ctrl_En | Reserved | | | | | | |
| Byte 3 | Pwr_Ctrl_Conf. | | | | | | | |
| Byte 4 | Reserved | | | | | | | |
| Byte 5 | | | | | | | | |
| ... | | | | | | | | |
| Byte 15 | | | | | | | | |

FIG. 16

| Bit / Byte | Bit 7 | Bit 6 | Bit 5 | Bit 4 | Bit 3 | Bit 2 | Bit 1 | Bit 0 |
|---|---|---|---|---|---|---|---|---|
| Byte 0 | SP | SPF(0b) | Page Code(38h) | | | | | |
| Byte 1 | Page Length(10h) | | | | | | | |
| Byte 2 | Pwr_TempCal_En | Reserved | | | | | | |
| Byte 3 | Pwr_TempCal_Conf. 1 | | | | | | | |
| Byte 4 | Pwr_TempCal_Conf. 2 | | | | | | | |
| Byte 5 | Pwr_TempCal_Conf. 3 | | | | | | | |
| Byte 6 | Reserved | | | | | | | |
| ... | | | | | | | | |
| Byte 15 | | | | | | | | |

MEMORY SYSTEM AND INFORMATION PROCESSING SYSTEM

CROSS-REFERENCE TO RELATED APPLICATION(S)

This application is based upon and claims the benefit of priority from Japanese Patent Application No. 2022-044353, filed Mar. 18, 2022, and Japanese Patent Application No. 2022-131713, filed Aug. 22, 2022, the entire contents of which are incorporated herein by reference.

FIELD

Embodiments described herein relate generally to a memory system, an information processing system, and a method performed by a memory system.

BACKGROUND

A memory system such as a solid-state drive (SSD) includes a non-volatile semiconductor memory (hereinafter referred to as a non-volatile memory) to store data. Access speeds for such things as read, write, and the like of the SSD are steadily increasing, but in general, any SSD with higher speeds tends to have a larger power consumption.

An SSD is often coupled to an external device, which is an information processing device such as a general purpose computer. The external device transmits various commands to the SSD to access the SSD. The external device also supplies power to the SSD. The power supply capacity of the external device differs depending on the type of the external device as well as the usage mode such as whether the external device is presently coupled to an AC power supply (e.g., plugged into a wall electrical outlet) or operating on battery. When the external device is a server, a desktop PC, and the like, the power supply capacity of the external device is high. When the external device is a mobile device such as a notebook PC or a smart phone, the power supply capacity of the external device is low. There is a significant difference in the power supply capacity between these two external device types. When the power consumption of the SSD becomes large, certain external devices may not be able to supply the power required for the SSD, and the SSD may not be able to operate properly. Thus, the faster SSDs, the fewer external devices are compatible with the SSD.

BRIEF DESCRIPTION OF THE DRAWINGS

FIG. 3 depicts a table showing a stay time ratio of each operation mode of a memory system according to a first embodiment.

FIG. 6 depicts a data structure of a maximum power rating setting command according to a first embodiment.

FIG. 7 depicts another data structure of a maximum power rating setting command according to a first embodiment.

FIG. 8 is a flowchart of processing for switching an operation mode according to a first embodiment.

FIG. 9 depicts a table showing maximum power rating change values according to a second embodiment.

FIG. 10 depicts a data structure of a maximum power rating change command according to a second embodiment.

FIG. 11 depicts another data structure of a maximum power rating change command according to a second embodiment.

FIG. 16 depicts a data structure of a PID coefficient setting command according to a third embodiment.

DETAILED DESCRIPTION

Figures 1, 2:
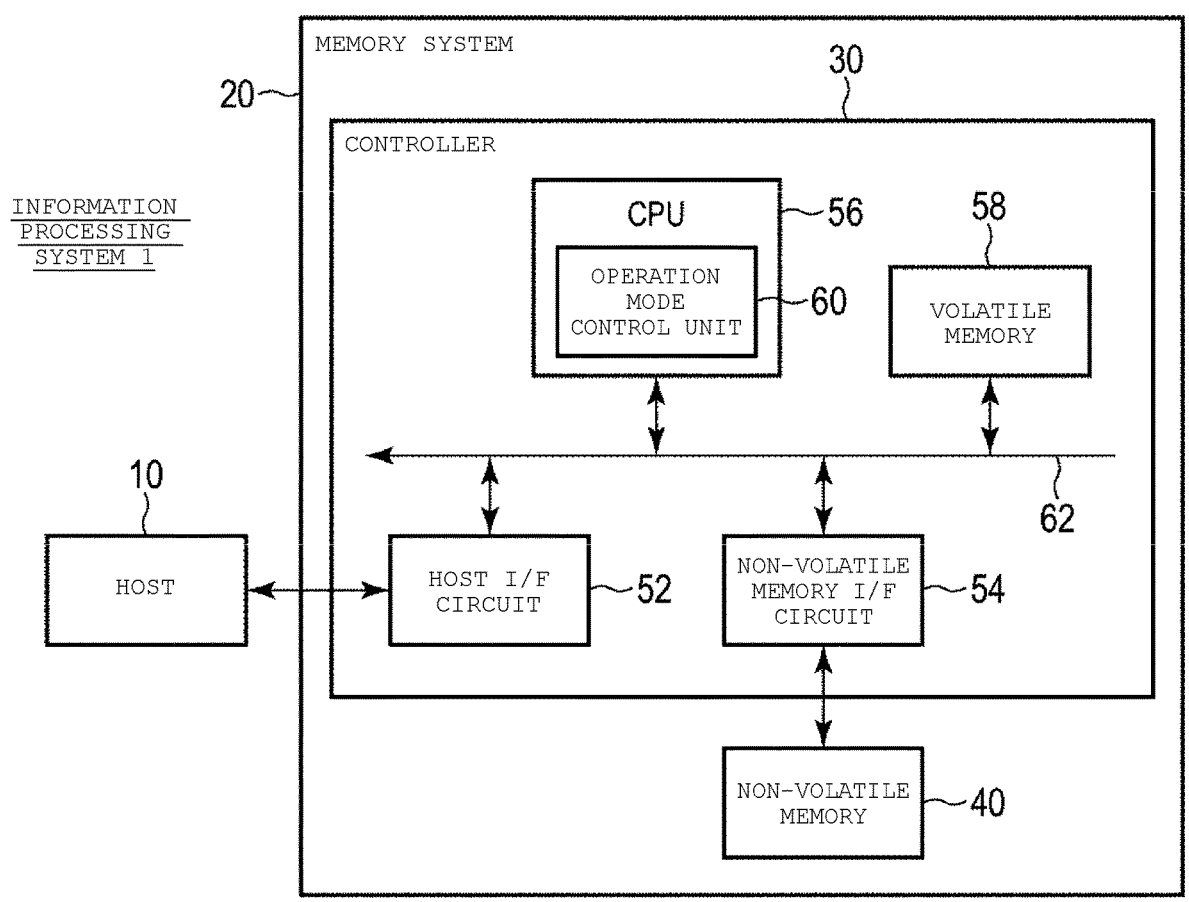
FIG. 1 is a hardware block diagram of an information processing system according to a first embodiment.
FIG. 2 depicts a table showing a relationship between an operation speed and an average power consumption value for each of a plurality of operation modes of a memory system according to a first embodiment.

Embodiments provide a memory system and an information processing system that adjusts operation so that power consumption does not exceed a supplied power limit.

In general, according to one embodiment, a memory system is connectable to an external device that can supply power thereto, and includes a non-volatile memory that stores data indicating a plurality of operation modes in association with different power consumption values. The memory system further includes a controller configured to, upon receipt of a first command indicating a first value of the power from the external device, determine a first ratio of execution times of the operation modes, and control the non-volatile memory using the operation modes according to the determined first ratio.

Hereinafter, certain example embodiments will be described with reference to the drawings. The following description exemplifies certain devices and methods for explaining technical ideas and concepts of the present disclosure. Modifications to the described examples that are readily apparent to those of ordinary skill in the art are included in the scope of the present disclosure. In the drawings, the relationships and ratios of dimensions of depicted elements or aspects may differ drawing to drawing. In the drawings, the same or substantially similar elements are given the same reference numeral. Different names may be given to an element, but these names are merely examples and should not be considered limitations.

First Embodiment

FIG. 1 is a hardware block diagram of an information processing system 1 according to a first embodiment.

The information processing system 1 includes a host 10 and a memory system 20.

The host 10 is an information processing device. The host 10 transmits various commands to the memory system 20 in order to access the memory system 20.

The memory system 20 is a storage device provided outside the host 10. The memory system 20 is coupled to the host 10 via a cable or a network connection. In other examples, the memory system 20 may be built in (integrated with) the host 10.

The memory system 20 includes a controller 30 and a non-volatile memory 40.

The controller 30 is an integrated circuit. The controller 30 is, for example, a system on a chip (SoC). The controller 30 controls the operation of the non-volatile memory 40.

The non-volatile memory 40 is, for example, a NAND type flash memory or a NOR type flash memory. The non-volatile memory 40 can store data even while power is not supplied.

The controller 30 includes a host interface (I/F) circuit 52, a non-volatile memory interface (I/F) circuit 54, a central processing unit (CPU) 56, and a volatile memory 58. The host I/F circuit 52, the non-volatile memory I/F circuit 54, the CPU 56, and the volatile memory 58 are coupled to each other via the bus line 62.

The host I/F circuit 52 is an interface circuit such as serial ATA (SATA), serial attached SCSI (SAS), UFS, PCI express (PCIe)™, and Ethernet™. The SATA interface includes a form factor of U.2, M.2, and mSATA. The PCIe interface includes a form factor of AIC, M.2, and U.2. The SAS interface includes a form factor of U.2. The host I/F circuit 52 couples the controller 30 and the host 10 to be communicable with each other.

The non-volatile memory I/F circuit 54 is an interface circuit. When the non-volatile memory 40 is a NAND type flash memory, the non-volatile memory I/F circuit 54 is, for example, a Toggle NAND flash interface and an Open NAND flash interface (ONFI). The non-volatile memory I/F circuit 54 couples the controller 30 and the non-volatile memory 40 to be communicable with each other.

The CPU 56 is a processor. The CPU 56 operates as an operation mode control unit 60 by executing firmware. The firmware is stored in the non-volatile memory 40. The firmware is transferred from the non-volatile memory 40 to the volatile memory 58. The CPU 56 executes the firmware in the volatile memory 58.

The volatile memory 58 is, for example, a dynamic random access memory (DRAM) of a double data rate 3 low voltage (DDR3L) standard. The volatile memory 58 can store data only while power is supplied. The volatile memory 58 may be provided outside the controller 30.

The memory system 20 according to a first embodiment can operate in one of a plurality of operation modes with different average power consumption. The plurality of operation modes are referred to as operation modes A, B, C, and D. The average power consumption is represented by a value obtained by dividing the measurement value of the power consumption of each operation mode by the operation time of each operation mode. The power consumption is measured before shipment, and average power consumption is calculated at that time. The average power consumption is highest in the operation mode A, gradually decreases in the operation modes B, C, and D, and is the lowest in the operation mode D. A clock frequency is highest in the operation mode A, and subsequently decreases in the operation modes B, C, and D. When the clock frequency is high, the average power consumption is high. When the clock frequency is low, the average power consumption is low. The operation mode D is, for example, an operation mode in which some functions are disabled.

FIG. 2 depicts a table showing a relationship between an operation speed and an average power consumption value for each of a plurality of operation modes of the memory system 20 according to the first embodiment. Data indicating the relationship between operation mode and average power consumption value is stored in the nonvolatile memory 40. The data indicating the relationship between operation mode and average power consumption value is also called first data. The operation speed is, for example, a write speed or a read speed. The write speed is the data transfer speed from the host 10 to the nonvolatile memory 40 when the host 10 writes data to the nonvolatile memory 40. The read speed is the data transfer speed from the nonvolatile memory 40 to the host 10 when the host 10 reads data from the nonvolatile memory 40. Data transfer rate is the size of transferred data per second (MB/s).

The maximum value of power that is able to be consumed by the memory system 20 is determined based on supplied power. The memory system 20 selects and executes the operation mode A, the operation mode B, the operation mode C, or the operation mode D so that the average power consumption does not exceed the supplied power. The maximum value of the average power consumption allowed for the memory system 20 to operate normally is referred to as an average power consumption target value P. The average power consumption target value P is also called a first target value for power consumption.

FIG. 3 depicts a table showing a stay time ratio of each operation mode of a memory system 20 according to the first embodiment. A stay time ratio $T_A$ of the operation mode A is a ratio of the operation time in the operation mode A to the total time of the operation time in the operation mode A, the operation time of the operation mode B, the operation time of the operation mode C, and the operation time of the operation mode D. A stay time ratio $T_B$ of the operation mode B is a ratio of the operation time in the operation mode B to the total time of the operation time in the operation mode A, the operation time of the operation mode B, the operation time of the operation mode C, and the operation time of the operation mode D. A stay time ratio $T_C$ of the operation mode C is a ratio of the operation time in the operation mode C to the total time of the operation time in the operation mode A, the operation time of the operation mode B, the operation time of the operation mode C, and the operation time of the operation mode D. A stay time ratio $T_D$ of the operation mode D is a ratio of the operation time in the operation mode D with respect to the total time of the operation time in the operation mode A, the operation time of the operation mode B, the operation time of the operation mode C, and the operation time of the operation mode D.

When the average power consumption target value P is 10,000 mW or more, the stay time ratio $T_A$ of the operation mode A is 1 and the stay time ratio $T_B$ of the operation mode B, the stay time ratio $T_C$ of the operation mode C, and the stay time ratio $T_D$ of the operation mode D are 0.

When the average power consumption target value P is less than 10,000 mW but 6,000 mW or more, the operation speed becomes the fastest by switching between the operation modes A and B for execution. In that case, the stay time ratio $T_A$ is 1−(10000−P)/4000. The stay time ratio $T_B$ is (10000−P)/4000. The stay time ratio $T_C$ and the stay time ratio $T_D$ are 0.

When the average power consumption target value P is less than 6,000 mW but 2,300 mW or more, the operation speed becomes the fastest by the operation mode control unit 60 switching between the operation modes B and C for execution. In that case, the stay time ratio $T_B$ is 1−(6000−P)/3700. The stay time ratio $T_C$ is (6000−P)/3700. The stay time ratio $T_A$ and the stay time ratio $T_D$ are 0.

When the average power consumption target value P is less than 2300 mW but 500 mW or more, the operation speed becomes the fastest by the operation mode control unit 60 switching between the operation modes C and D for execution. In that case, the stay time ratio $T_C$ is 1−(2300−P)/1800. The stay time ratio $T_D$ is (2300−P)/1800. The stay time ratio $T_A$ and the stay time ratio $T_B$ are 0.

When the average power consumption target value P is less than 500 mW, the memory system 20 stops operation.

A formula that permits calculation of the stay time ratios $T_A$, $T_B$, $T_C$, and $T_D$ from the average power consumption target value P is referred to in this context as a derived operating function. The derived operating function is stored in a control data storage area in the non-volatile memory 40.

Figures 4, 5:
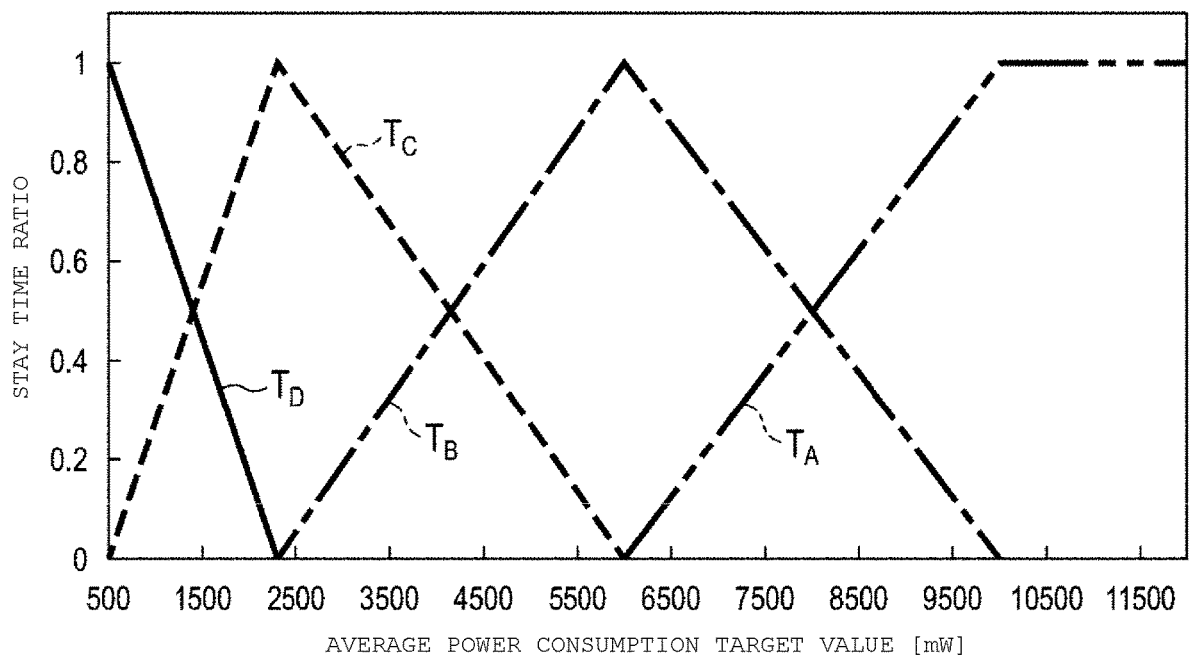
FIG. 4 depicts a graph of a stay time ratio of each operation mode according to a first embodiment.
FIG. 5 depicts a table showing a relationship of a power supply capacity, a cooling capacity, and a maximum power rating setting value of a host for each usage mode of a host in a memory system according to a first embodiment.

FIG. 4 depicts a graph—of a stay time ratio of each operation mode according to the first embodiment. The vertical axis is the stay time ratio value. The horizontal axis is the average power consumption target value P (mW).

When the average power consumption target value P changes from 500 mW to 2300 mW, the stay time ratio $T_C$ of the operation mode C increases from 0 to 1. During the same period, the stay time ratio $T_D$ of the operation mode D decreases from 1 to 0.

When the average power consumption target value P changes from 2,300 mW to 6,000 mW, the stay time ratio $T_B$ of the operation mode B increases from 0 to 1. During the same period, the stay time ratio $T_C$ of the operation mode C decreases from 1 to 0.

When the average power consumption target value P changes from 6,000 mW to 10,000 mW, the stay time ratio $T_A$ of the operation mode A increases from 0 to 1. During the same period, the stay time ratio $T_B$ of the operation mode B decreases from 1 to 0.

When the average power consumption target value P exceeds 10,000 mW, the stay time ratio $T_A$ of the operation mode A is maintained at 1, and the stay time ratio $T_B$ of the operation mode B is maintained at 0.

FIG. 5 depicts a table showing a relationship of a power supply capacity, a cooling capacity, and a maximum power rating setting value of the host 10 for each usage mode of the host 10 in the memory system 20 according to the first embodiment. The usage mode of the host 10 concerns the type of the host 10, the usage environment of the host 10, and the coupling mode between the host 10 and the memory system 20. The maximum power rating setting value is information notified by (sent from) the host 10 to the memory system 20. The maximum power rating setting value represents power that is suppliable to the memory system 20 by the host 10. The maximum power rating setting value is also called first information. The maximum power rating setting value is determined by the usage mode, the power supply capacity, and the cooling capacity of the host 10.

For example, when the usage mode of the host 10 is a desktop PC, the power supply capacity of the host 10 is 100 W at the maximum. When the usage mode of the host 10 is a desktop PC, the cooling capacity of the host 10 is high. When the usage mode of the host 10 is a desktop PC, the maximum power rating setting value is 100 W.

For example, when the usage mode of the host 10 is a notebook PC, the power supply capacity of the host 10 is 10 W at the maximum. When the usage mode of the host 10 is a notebook PC, the cooling capacity of the host 10 is slightly high. When the usage mode of the host 10 is a notebook PC, the maximum power rating setting value is any of 3 W to 10 W.

For example, when the usage mode of the host 10 is a smart phone, the power supply capacity of the host 10 is 3 W at the maximum. When the usage mode of the host 10 is a smart phone, the cooling capacity of the host 10 is slightly low. When the usage mode of the host 10 is a smart phone, the maximum power rating setting value is any of 1 W to 3 W.

For example, when the usage mode of the host 10 is a USB storage, the power supply capacity of the host 10 is 100 W at the maximum. When the usage mode of the host 10 is a USB storage, the cooling capacity of the host 10 is low. When the usage mode of the host 10 is a USB storage, the maximum power rating setting value is any of 0 W to 10 W.

Information indicating the relationship of the power supply capacity, the cooling capacity, and the maximum power rating setting value for each possible usage mode for the host 10 can be stored in host memory provided within the host 10. When the memory system 20 is coupled, the host 10 reads the maximum power rating setting value for each usage mode from the host memory. The host 10 notifies the memory system 20 of the maximum power rating setting value accordingly.

FIG. 6 depicts a data structure of a maximum power rating setting command according to the first embodiment. The maximum power rating setting command is transmitted by the host 10 to the memory system 20. The maximum power rating setting command includes data related to the maximum power rating setting value. FIG. 6 is an example of the maximum power rating setting command using the Set Features command of the NVMe.

In NVMe, the command is 64 KB. The command format of NVMe includes command Dword0 (CDW0) of Byte [03:00], namespace identifier (NSID) of Byte [07:04], Reserved of Byte [15:08], metadata pointer (MPTR) of Byte [23:16], data pointer (DPTR) of Byte [39:24], command Dword10 (CDW10) of Byte [43:40], command Dword11 (CDW11) of Byte [47:44], command Dword12 (CDW12) of Byte [51:48], command Dword13 (CDW13) of Byte [55:52], command Dword14 (CDW14) of Byte [59:56], and command Dword15 (CDW15) of Byte [63:60].

The operation code (09h) of SetFeature is set in OPC of Bit [07:00] of the command Dword0 (CDW0).

The command Dword10 (CDW10) includes Save (SV) of Bit [31], Reserved of Bit [30:08], and feature identifier (FID) of Bit [07:00].

16 bytes of the command Dword12 (CDW12), the command Dword13 (CDW13), the command Dword14 (CDW14), and the command Dword15 (CDW15) are data related to the maximum power rating setting value.

Pwr_Max_En of Bit 7 of Byte 2 is data indicating that the notification of the maximum power rating setting value is valid or invalid. When Pwr_Max_En is 1b, the notification of the maximum power rating setting value is valid. When Pwr_Max_En is 0b, the notification of the maximum power rating setting value is invalid.

Pwr_Max_Conf. of 16-bit of Bytes 3 and 4 is the maximum power rating setting value. For example, when Pwr_Max_Conf. is 0001h, the maximum power rating setting value is 100 mW. When Pwr_Max_Conf. is 0002h, the maximum power rating setting value is 200 mW. When Pwr_Max_Conf. is 0003h, the maximum power rating setting value is 300 mW. When Pwr_Max_Conf. is FFFFh, the maximum power rating setting value is 6,553,500 mW.

FIG. 7 depicts another data structure of the maximum power rating setting command according to the first embodiment. FIG. 7 shows a Mode Page command of SAS.

Pwr_Max_En of Bit 7 of Byte 2 of the Mode Page command is data indicating that the notification of the maximum power rating setting value is valid or invalid. When Pwr_Max_En is 1b, the notification of the maximum power rating setting value is valid. When Pwr_Max_En is 0b, the notification of the maximum power rating setting value is invalid.

Pwr_Max_Conf. of 16-bit of Bytes 3 and 4 is the maximum power rating setting value. For example, when Pwr_Max_Conf. is 0001h, the maximum power rating setting value is 100 mW. When Pwr_Max_Conf. is 0002h, the maximum power rating setting value is 200 mW. When Pwr_Max_Conf. is 0003h, the maximum power rating setting value is 300 mW. When Pwr_Max_Conf. is FFFFh, the maximum power rating setting value is 6,553,500 mW.

FIG. 8 is a flowchart of processing performed by the operation mode control unit 60 to switch an operation mode according to the first embodiment. When the memory system 20 receives the maximum power rating setting command shown in FIG. 6 or 7, the CPU 56 operates as the operation mode control unit 60 to execute the operation mode switching processing shown in FIG. 8.

The operation mode control unit 60 determines whether Pwr_Max_En included in the maximum power rating setting command is 1b (S12).

When Pwr_Max_En is 1b (YES in the S12), the operation mode control unit 60 obtains the maximum power rating setting value from Pwr_Max_Conf. included in the maximum power rating setting command (S14).

The operation mode control unit 60 reads a derived operating function corresponding to a value of the average power consumption target value P from the non-volatile memory 40, with the maximum power rating setting value as the average power consumption target value P (S16).

The operation mode control unit 60 determines the stay time ratios $T_A$, $T_B$, $T_C$, and $T_D$ of each operation mode based on the read derived operating function and the average power consumption target value P (S18).

The operation mode control unit 60 reads first data from nonvolatile memory 40. The operation mode control unit 60 switches the operation mode of the memory system based on the read first data and the determined stay time ratios $T_A$, $T_B$, $T_C$, and $T_D$ (S20).

When Pwr_Max_En is 0b (NO in the S12), the operation mode control unit 60 fixes the operation mode of the memory system 20 to a default operation mode (S22).

After the processing of the S20 and the S22, the operation mode control unit 60 ends the operation mode switching processing (END).

According to the first embodiment, the memory system 20 determines the stay time ratios $T_A$, $T_B$, $T_C$, and $T_D$ of each operation mode based on the average power consumption target value P, with the notified maximum power rating setting value as the average power consumption target value P. Consequently, the average power consumption value of the memory system 20 is prevented from exceeding the power supply capacity of the host 10. One memory system 20 design can be applied as a built-in storage of a desktop PC or as a USB storage coupled to a host via USB.

Although the host 10 notifies the memory system 20 of the maximum power rating setting value, when the host 10 of a coupling destination of the memory system 20 is predetermined, the average power consumption target value P is determined in advance based on the usage mode, the power supply capacity, and the cooling capacity of the host 10 of a coupling destination.

Second Embodiment

In the second embodiment, when the power that is suppliable to the memory system 20 changes, the host 10 notifies the memory system 20 of information about a maximum power rating change value indicating the suppliable power after the change. The maximum power rating change value is also called second information.

FIG. 9 depicts a table showing maximum power rating change values according to the second embodiment. FIG. 9 shows examples of maximum power rating change values of the host 10 when the usage mode is a notebook PC. For example, when the power supply state of the host 10 supplies power up to 60 W to the memory system 20 via the USB cable (USB PD 60 W), the maximum power rating change value is 10,000 mW. For example, when the power supply state of the host 10 supplies power up to 30 W to the memory system 20 via the USB cable (USB PD 30 W), the maximum power rating change value is 6,000 mW. For example, when the power supply state of the host 10 is battery-powered (battery powered), the maximum power rating change value is 4,000 mW.

FIG. 10 depicts a data structure of a maximum power rating change command according to the second embodiment. FIG. 10 is an example of the maximum power rating change command using the Set Features command of NVMe. The maximum power rating change command is a command transmitted by the host 10 to the memory system 20. The maximum power rating change command includes data related to the maximum power rating change value.

Pwr_Ctrl_En of Bit 7 of Byte 2 is data indicating that the notification of the maximum power rating change value is valid or invalid. When Pwr_Ctrl_En is 1b, the notification of the maximum power rating setting change is valid. When Pwr_Ctrl_En is 0b, the notification of the maximum power rating setting change is invalid.

Pwr_Ctrl_Conf. of 16-bit of Bytes 3 and 4 is the maximum power rating change value. For example, when Pwr_Ctrl_Conf. is 0001h, the maximum power rating change value is 100 mW. When Pwr_Ctrl_Conf. is 0002h, the maximum power rating change value is 200 mW. When Pwr_Ctrl_Conf. is 0003h, the maximum power rating change value is 300 mW. When Pwr_Ctrl_Conf. is FFFFh, the maximum power rating change value is 6,553,500 mW.

FIG. 11 depicts another data structure of the maximum power rating change command according to the second embodiment. FIG. 11 is an example of the maximum power rating change command using the Mode Page command of SAS.

Pwr_Ctrl_En of Bit 7 of Byte 2 is data indicating that the notification of the maximum power rating change value is valid or invalid. When Pwr_Ctrl_En is 1b, the notification of the maximum power rating setting change is valid. When Pwr_Ctrl_En is 0b, the notification of the maximum power rating setting change is invalid.

Pwr_Max_Conf. of 16-bit of Bytes 3 and 4 is the maximum power rating change value. For example, when Pwr_Max_Conf. is 0001h, the maximum power rating change value is 100 mW. When Pwr_Max_Conf. is 0002h, the maximum power rating change value is 200 mW. When Pwr_Max_Conf. is 0003h, the maximum power rating change value is 300 mW. When Pwr_Max_Conf. is FFFFh, the maximum power rating change value is 6,553,500 mW.

Figure 12:
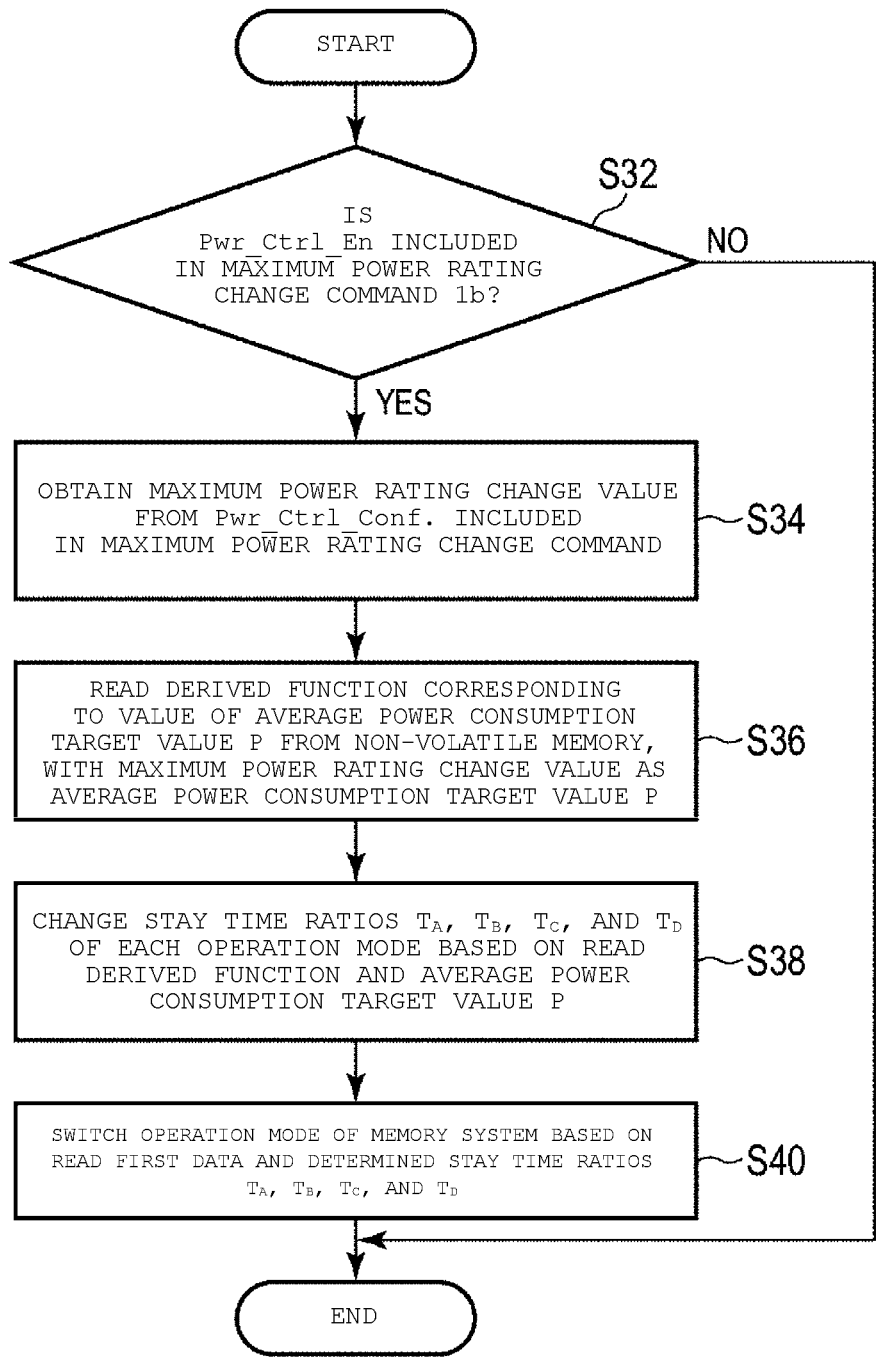
FIG. 12 is a flowchart of processing for switching an operation mode according to a second embodiment.

FIG. 12 is a flowchart of processing performed by the operation mode control unit 60 to switch the operation mode. When the memory system 20 receives the maximum power rating change command shown in FIG. 10 or 11, the CPU 56 operates as the operation mode control unit 60 to execute operation mode switching change processing shown in FIG. 12.

The operation mode control unit 60 determines whether Pwr_Ctrl_En included in the maximum power rating change command is 1b (S32).

When Pwr_Ctrl_En is 1b (YES in the S32), the operation mode control unit 60 obtains the maximum power rating change value from Pwr_Ctrl_Conf. included in the maximum power rating change command (S34).

The operation mode control unit 60 reads a derived operating function corresponding to the value of the average power consumption target value P from the non-volatile memory 40, with the maximum power rating change value as the average power consumption target value P (S36).

The operation mode control unit 60 changes the stay time ratios $T_A$, $T_B$, $T_C$, and $T_D$ of each operation mode based on the read derived operating function and the average power consumption target value P (S38).

The operation mode control unit 60 reads first data from nonvolatile memory 40. The operation mode control unit 60 switches the operation mode of the memory system based on the read first data and the determined stay time ratios $T_A$, $T_B$, $T_C$, and $T_D$ (S40). After the processing of the S40, the operation mode control unit 60 ends the operation mode switching change processing (END).

When Pwr_Ctrl_En is 0b (NO in the S32), the operation mode control unit 60 ends the operation mode switching change processing (END). When Pwr_Ctrl_En is 0b, the stay time ratios $T_A$, $T_B$, $T_C$, and $T_D$ of each operation mode are maintained.

According to the second embodiment, the memory system 20 determines the stay time ratios $T_A$, $T_B$, $T_C$, and $T_D$ of each operation mode based on the average power consumption target value P, with the notified maximum power rating change value as the average power consumption target value P. Consequently, although the power supply state of the host 10 changes during the operation of the memory system 20, the average power consumption value of the memory system 20 is prevented from exceeding the power supply capacity of the host 10. The memory system 20 is applicable to a built-in storage of a desktop PC or a USB storage coupled to a host via USB.

Third Embodiment

Figure 13:
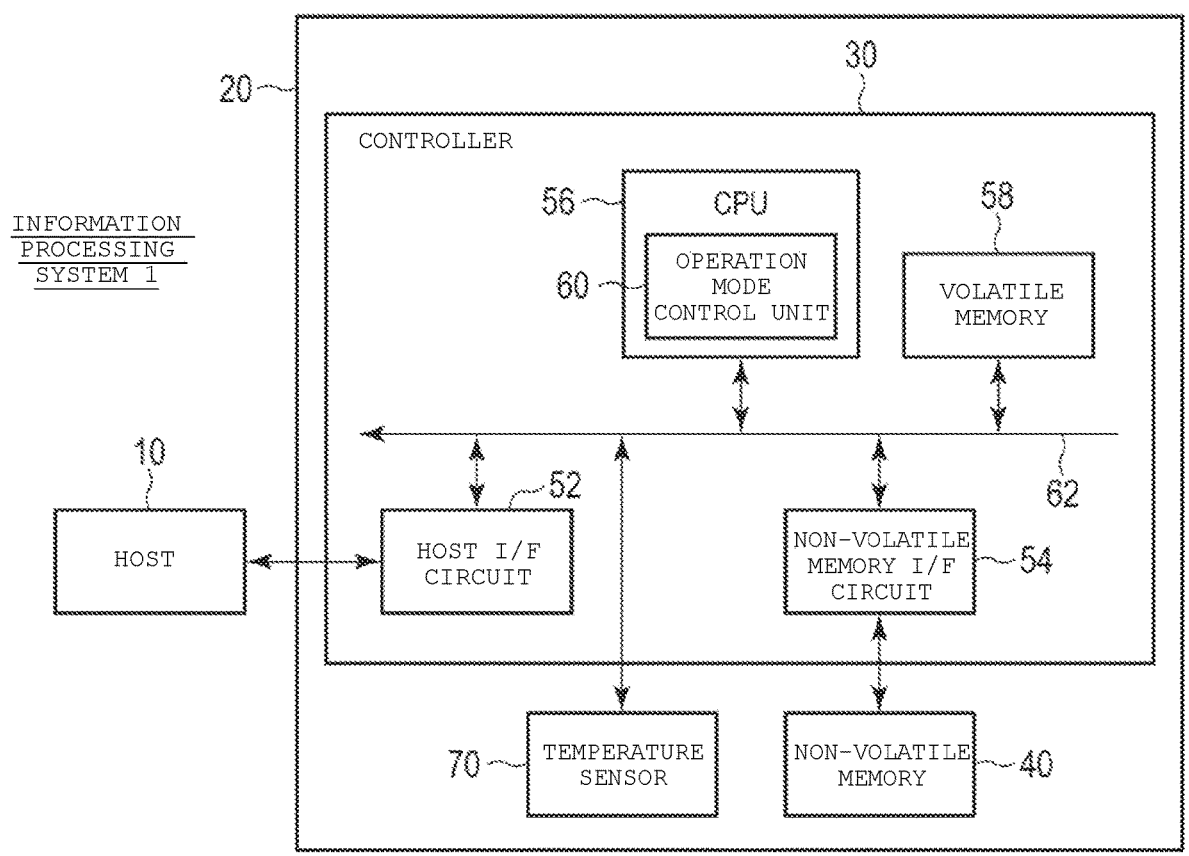
FIG. 13 is a hardware block diagram of an information processing system including a memory system according to a third embodiment.

FIG. 13 is a hardware block diagram of an information processing system 1 including a memory system 20 according to the third embodiment. The memory system 20 according to the third embodiment further includes a temperature sensor 70 for measuring a temperature of the memory system 20. The output signal of the temperature sensor 70 is representative of a temperature of the memory system 20. The temperature sensor 70 may be attached to the nonvolatile memory 40 or the controller 30, or may be attached to each of the nonvolatile memory 40 and the controller 30. Alternatively, the temperature sensor 70 may be attached to each of the host I/F circuit 52, the nonvolatile memory I/F circuit 54, the CPU 56, and the volatile memory 58, which are internal components of the controller 30, or the host I/F circuit 52, the nonvolatile memory I/F circuit 54, the CPU 56, or the volatile memory 58. The temperature sensor 70 is connected to the bus line 62. The output signal of the temperature sensor 70 is input to the operation mode control unit 60 via the bus line 62.

Figure 14:
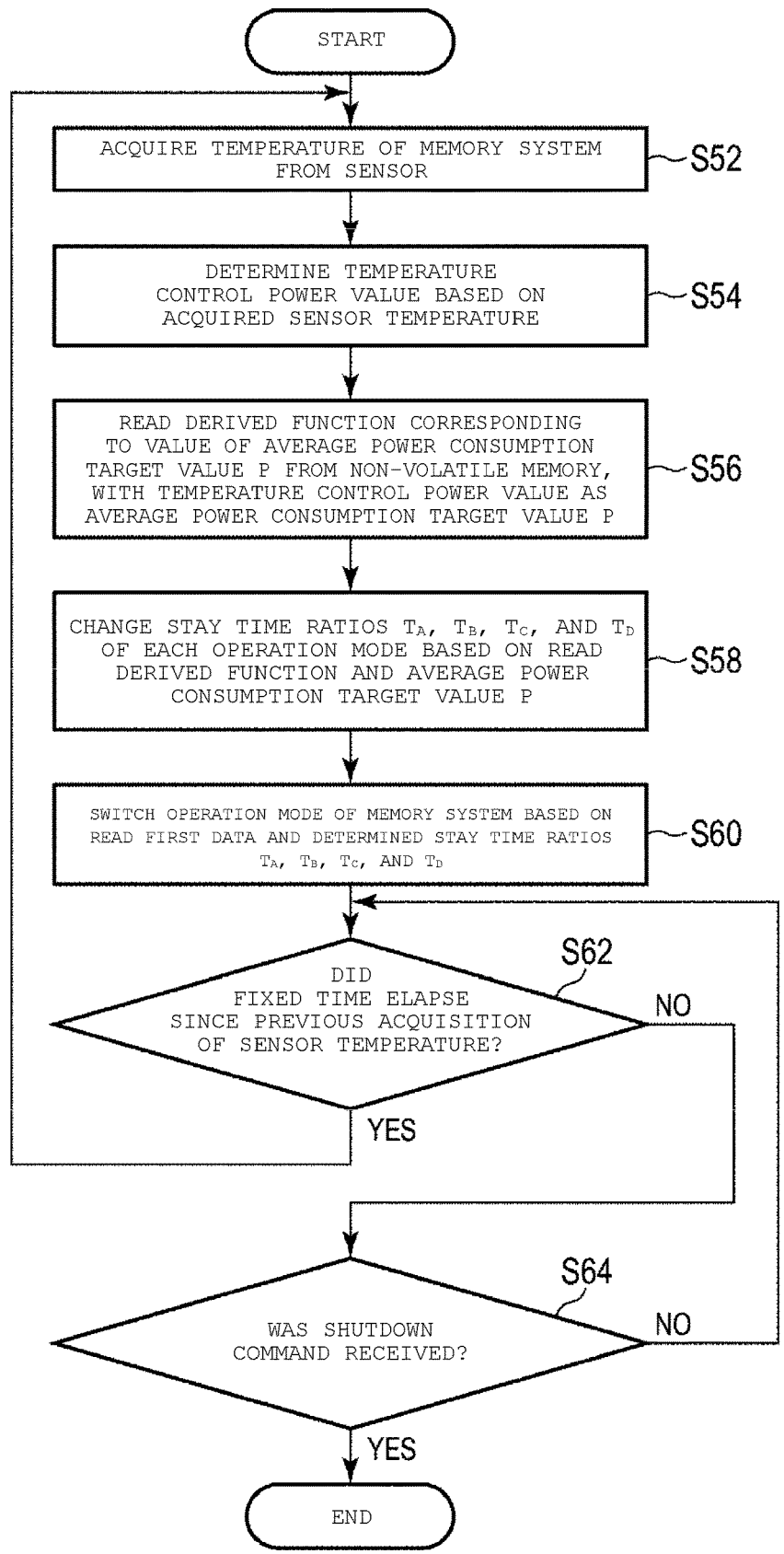
FIG. 14 is a flowchart of processing for switching an operation mode according to a third embodiment.

FIG. 14 is a flowchart of processing performed by the operation mode control unit 60 to switch an operation mode according to the third embodiment. When power is supplied to the memory system 20 and the CPU 56 starts up, the CPU 56 operates as the operation mode control unit 60 to execute the operation mode switching processing shown in FIG. 14.

The operation mode control unit 60 acquires a temperature for the memory system 20 from the temperature sensor 70 (S52). The temperature for the memory system 20 acquired from the sensor is referred to in this context as a sensor temperature or measured temperature.

Then, the operation mode control unit 60 determines a temperature control power value based on the acquired sensor temperature (S54). The temperature control power value is an upper limit value of the power that is able to be consumed by the memory system 20 within a range in which the temperature of the memory system 20 does not exceed an operation upper limit temperature. The operation upper limit temperature is the temperature at or above which normal operation of the memory system 20 cannot be guaranteed. The manufacturer of the memory system 20 typically sets or provides the operation upper limit temperature. Details of determining the temperature control power value will be described later.

The operation mode control unit 60 reads a derived operating function corresponding to the value of the average power consumption target value P from the non-volatile memory 40, with the temperature control power value as the average power consumption target value P (S56).

The operation mode control unit 60 changes the stay time ratios $T_A$, $T_B$, $T_C$, and $T_D$ of each operation mode based on the read derived operating function and the average power consumption target value P (S58).

The operation mode control unit 60 reads first data from nonvolatile memory 40. The operation mode control unit 60 switches the operation mode of the memory system 20 based on the read first data and the determined stay time ratios $T_A$, $T_B$, $T_C$, and $T_D$ (S60).

The operation mode control unit 60 determines whether a fixed time elapsed since the previous acquisition of the sensor temperature (S62). That is, the operation mode control unit 60 determines whether a certain period of time has passed since the execution timing of S52. The fixed time is, for example, 1 second.

When the fixed time elapsed since the previous acquisition of the sensor temperature (YES in the S62), the operation mode control unit 60 again acquires the temperature in the memory system 20 from the sensor (S52).

When the fixed time did not elapse since the previous acquisition of the sensor temperature (NO in S62), the operation mode control unit 60 determines whether the memory system 20 received a shutdown command (S64). The processing of determining whether the shutdown command was received (S64) is not limited to being executed after the execution of the determination processing of whether the fixed time elapsed since the previous acquisition of the sensor temperature (S62), but may be executed after the execution of the processing (S52, S54, S56, S58 or S60) shown in FIG. 14.

When the memory system 20 received the shutdown command (YES in the S64), the operation mode control unit 60 ends the operation mode switching processing (END).

When the memory system 20 did not receive the shutdown command (NO in the S64), the operation mode control unit 60 executes determination (S62) as to whether the fixed time elapsed since the previous acquisition of the sensor temperature.

Next, determination of the temperature control power value will be described. In determining the temperature control power value, the operation mode control unit 60 uses a method of switching control, proportional control (P control), proportional integral control (PI control), or proportional integral differential control (PID control). A PID coefficient is required for the switching control, the proportional control, the proportional integral control, or the proportional integral differential control. For example, the host 10 notifies the memory system 20 of the PID coefficient. Alternatively, the memory system 20 stores the PID coefficient in advance.

When the determination method of the temperature control power value is the switching control method, the PID coefficient is, for example, a threshold value, a first power value, and a second power value. The threshold value is a fixed temperature. When the determination method of the temperature control power value is the switching control method and the sensor temperature is less than the threshold value, the operation mode control unit 60 sets the first power value as the temperature control power value. When the determination method of the temperature control power value is the switching control method and the sensor temperature is equal to or higher than the threshold value, the operation mode control unit 60 sets the second power value as the temperature control power value.

When the determination method of the temperature control power value is the proportional control method, the PID coefficient is, for example, a proportional gain. When the determination method of the temperature control power value is the proportional control method, the temperature control power value is a value calculated from the sensor temperature and the proportional gain.

When the determination method of the temperature control power value is the proportional integral control method, the PID coefficients are, for example, a proportional gain and an integral gain. When the determination method of the temperature control power value is the proportional integral control method, the temperature control power value is a value calculated from the sensor temperature, the proportional gain, and the integral gain.

When the determination method of the temperature control power value is the proportional integral differential control method, the PID coefficients are, for example, a proportional gain, an integral gain, and a differential gain. When the determination method of the temperature control power value is the proportional integral differential control method, the temperature control power value is a value calculated from the sensor temperature, the proportional gain, the integral gain, and the differential gain.

Next, aspects of switching control, proportional control (P control), proportional integral control (PI control), and PID control will be described.

(1) Switching Control:

In the switching control, the operation mode control unit 60 changes the temperature control power value discontinuously (also referred to as a stepped shape) based on the sensor temperature. The switching control has the advantage of being easy to implement. The switching control is expressed as follows.

When $T<L1, W\mathrm{max}=A1$

When $L1 \leq T < L2, W\mathrm{max}=A2$

When $L3 \leq T, W\mathrm{max}=A5$

Here, Wmax is the temperature control power value. T is the sensor temperature. L1, L2, and L3 are threshold values for the temperature at which Wmax is switched. The threshold value L1 is the lowest and the threshold value L3 is the highest. For example, A1=10,000 mW, A2=1,000 mW, and A3=500 mW. When the sensor temperature T is less than the threshold value L1, Wmax is A1. When the sensor temperature T is equal to or higher than the threshold value L3, Wmax is A3.

In the switching control, the sensor temperature is compared with a plurality of threshold values, and a plurality of power values is set as temperature control power values according to the plurality of comparison results. When the number of threshold values is 2, the PID coefficients are a first threshold value, a second threshold value, a first power value, a second power value, and a third power value. The second threshold value is equal to or higher than the first threshold value. When the determination method of the temperature control power value is the switching control method and the sensor temperature is less than the first threshold value, the temperature control power value is the first power value. When the determination method of the temperature control power value is the switching control method, the sensor temperature is equal to or higher than the first threshold value, and the sensor temperature is lower than the second threshold value, the temperature control power value is the second power value. When the determination method of the temperature control power value is the switching control method and the sensor temperature is equal to or higher than the second threshold value, the temperature control power value is the third power value.

(2) Proportional Control:

When switching levels are subdivided using a plurality of threshold values in the switching control, the switching control becomes the proportional control. In the proportional control, the temperature control power value changes continuously. The proportional control is expressed by Equation 1.

$$W\mathrm{max}=K_p e(t) \qquad \text{Equation 1}$$

Here, Kp is a proportional gain, and e(t) is a sensor temperature at a certain time t. The proportional gain Kp is a constant. The proportional gain Kp is determined in preliminary by simulation so that the average power consumption value of the memory system 20 converges to the temperature control power value Wmax in a short time.

Figure 15:
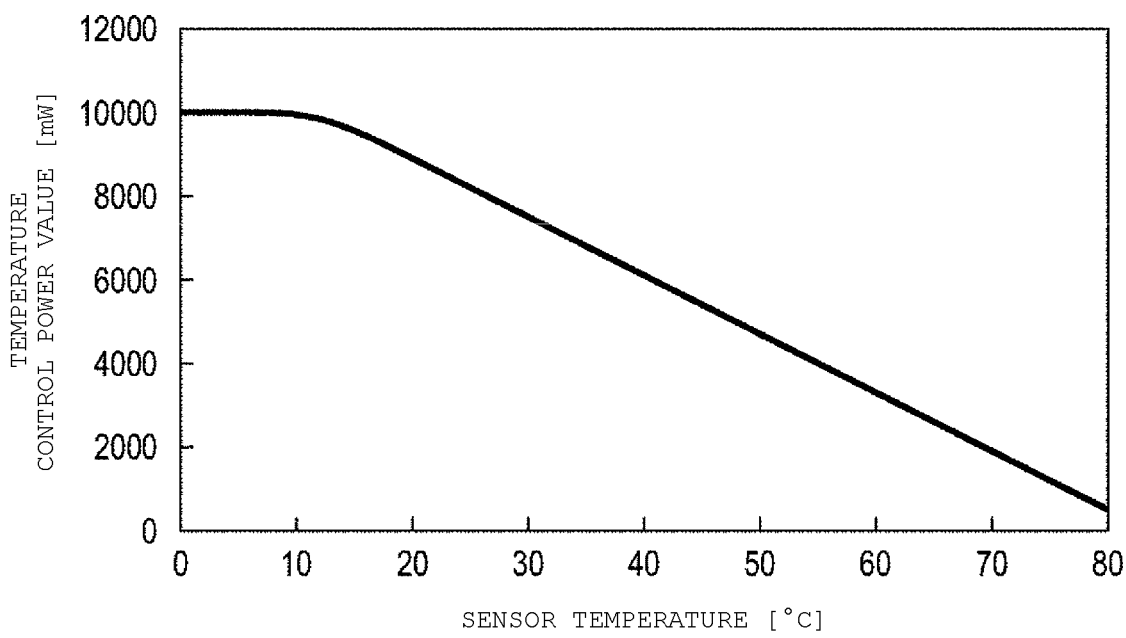
FIG. 15 depicts a graph of a temperature control power value with respect to a sensor temperature in a memory system according to a third embodiment.

FIG. 15 depicts a graph showing an example of the changes in the temperature control power value with respect to the sensor temperature in the memory system 20 according to the third embodiment when the determination method of the temperature control power value is the proportional control method. The vertical axis is the temperature control power value. The horizontal axis is the sensor temperature. Here, when the sensor temperature is below a certain temperature, the proportional control is not executed and the temperature control power value is a fixed value. The certain temperature is, for example, about 10 degrees. When the proportional control is used, the higher the sensor temperature, the lower the temperature control power value.

(3) Proportional Integral Control:

When an extrinsic factor such as the outside air temperature is added to the proportional control in the form of an integral term, the proportional integral control is obtained. Although it is difficult to measure the extrinsic factor, the extrinsic factor is able to be estimated according to the proportional integral control. The proportional integral control is expressed by Equation 2.

$$W\max = K_p e(t) + Ki \int_{t0}^{t1} e(\tau) d\tau \quad \text{Equation 2}$$

Here, Ki is an integral gain. The integral gain Ki is a constant. The integral gain Ki is determined in preliminary by simulation so that the average power consumption value of the memory system 20 converges to the temperature control power value Wmax in a short time.

(4) Proportional Differential Integral Control:

By adding feedback control as a differential term to the proportional integral control, the proportional differential integral control is obtained. According to the proportional integral differential control, although there is a sudden temperature change, the change in the maximum value of the target average power consumption becomes slower than the temperature change. Accordingly, although there is a sudden temperature change, it is possible to avoid frequent changes of the operation mode, which leads to an extension of the product lifetime. The proportional differential integral control is expressed by Equation 3.

$$W\max = K_p e(t) + Ki \int_{t0}^{t1} e(\tau) d\tau + K_d \frac{de(t)}{dt} \quad \text{Equation 3}$$

Here, Kd is a differential gain. The differential gain Kd is a constant. The differential gain Kd is determined in preliminary by simulation so that the power consumption of the memory system 20 converges to the temperature control power value Wmax in a short time.

FIG. 16 depicts a data structure of a PID coefficient setting command according to the third embodiment when the determination method of the temperature control power value is the proportional integral differential control method. The PID coefficient setting command is a command transmitted by the host 10 to the memory system 20. The PID coefficient setting command includes data related to the PID coefficient. FIG. 16 is an example of the PID coefficient setting command using the Set Features command of NVMe.

Pwr_TempCal_En of Bit 7 of Byte 2 is data indicating that the notification of the PID coefficient is valid or invalid. When Pwr_TempCal_En is 1b, the notification of the PID coefficient is valid. When Pwr_TempCal_En is 0b, the notification of the PID coefficient is invalid.

Pwr_TempCal_Conf. 1 of 8-bit of Byte 3 is the proportional gain Kp. Pwr_TempCal_Conf. 2 of 8-bit of Byte 4 is the integral gain Ki. Pwr_TempCal_Conf. 3 of 8-bit of Byte 5 is the differential gain Kd.

The PID coefficient setting command can be implemented using the Set Features command of NVMe.

Figure 17:
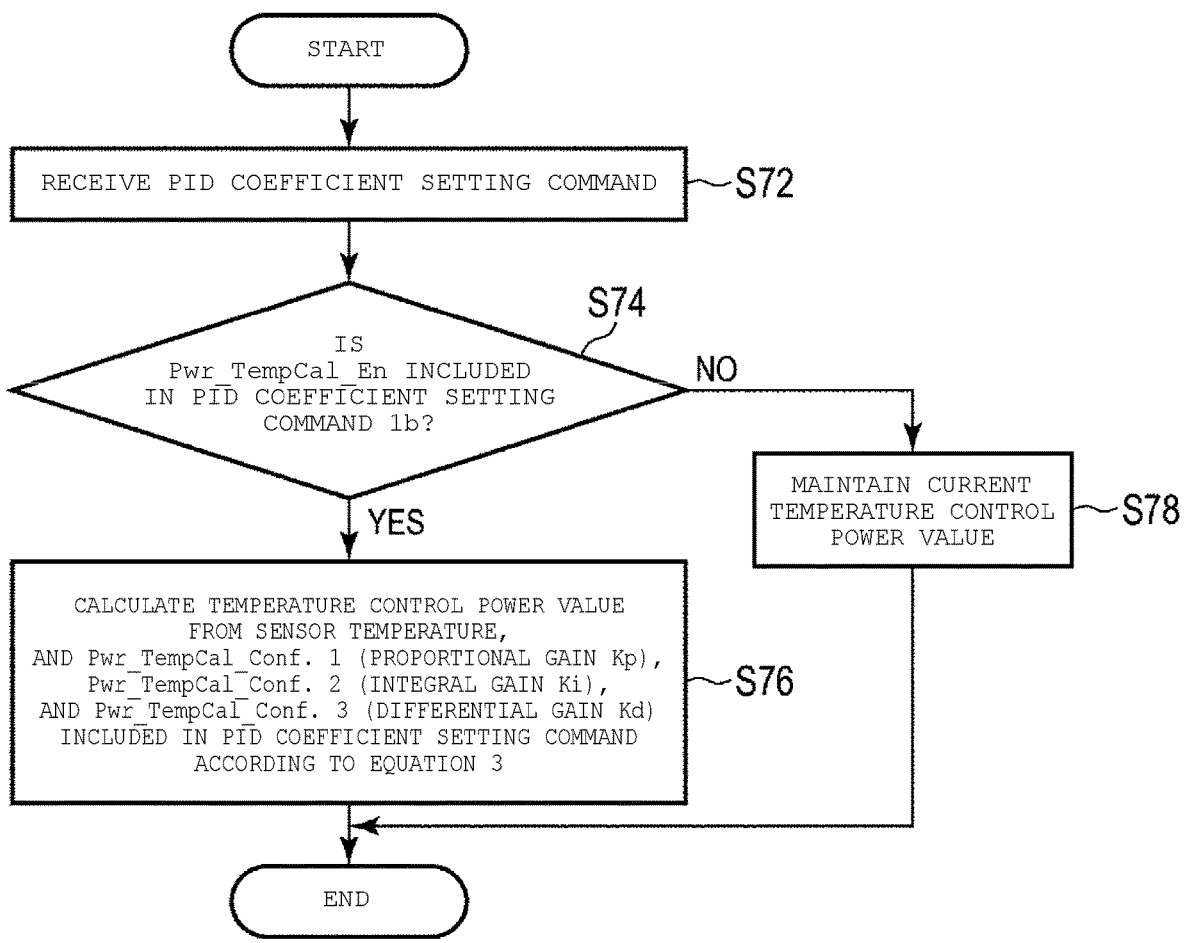
FIG. 17 is a flowchart of processing for calculating a temperature control power value according to a third embodiment.

FIG. 17 is a flowchart of processing performed by the operation mode control unit 60 to calculate the temperature control power value according to the third embodiment when the determination method of the temperature control power value is the proportional integral differential control method. The processing corresponds to the processing of the S54 in FIG. 14.

The operation mode control unit 60 receives the PID coefficient setting command (S72).

The operation mode control unit 60 determines whether Pwr_TempCal_En included in the PID coefficient setting command is 1b (S74).

When Pwr_TempCal_En is 1b (YES in the S74), the operation mode control unit 60 calculates the temperature control power value from the sensor temperature, and Pwr_TempCal_Conf. 1 (the proportional gain Kp), Pwr_TempCal_Conf. 2 (the integral gain Ki), and Pwr_TempCal_Conf. 3 (the differential gain Kd) included in the PID coefficient setting command according to Equation 3 (S76).

When Pwr_TempCal_En is 0b (NO in the S74), the operation mode control unit 60 maintains the current temperature control power value (S78).

After the execution of the S76 or the S78, the operation mode control unit 60 ends the calculation processing of the temperature control power value (END).

According to the third embodiment, the memory system 20 calculates the temperature control power value by using the switching control, the P control, the PI control, or the PID control, sets the temperature control power value as the average power consumption target value P, determines the stay time ratios $T_A$, $T_B$, $T_C$, and $T_D$ for each operation mode based on the average power consumption target value P. Consequently, the temperature in the memory system 20 is prevented from exceeding the operation upper limit temperature.

Fourth Embodiment

In the fourth embodiment, the memory system 20 determines the average power consumption target value P. The operation mode control unit 60 compares the maximum power rating setting value, the maximum power rating change value, and the temperature control power value, and determines the minimum value of the three values as the average power consumption target value P. Also, in the fourth embodiment, the operation mode control unit 60 periodically acquires a temperature of the memory system 20 from the temperature sensor 70. The time interval for the temperature acquisition is referred to as the predetermined time. The operation mode control unit 60 stores in the volatile memory 58 the temperature of the memory system 20 (sensor temperature) obtained from the temperature sensor 70. The operation mode control unit 60 can store the temperature of the memory system 20 acquired from the temperature sensor 70 at a certain timing as the first sensor temperature. The operation mode control unit 60 can further store the temperature of the memory system 20 acquired from the temperature sensor 70 at a timing after the predetermined time from the certain timing as the second sensor temperature.

Figure 18:
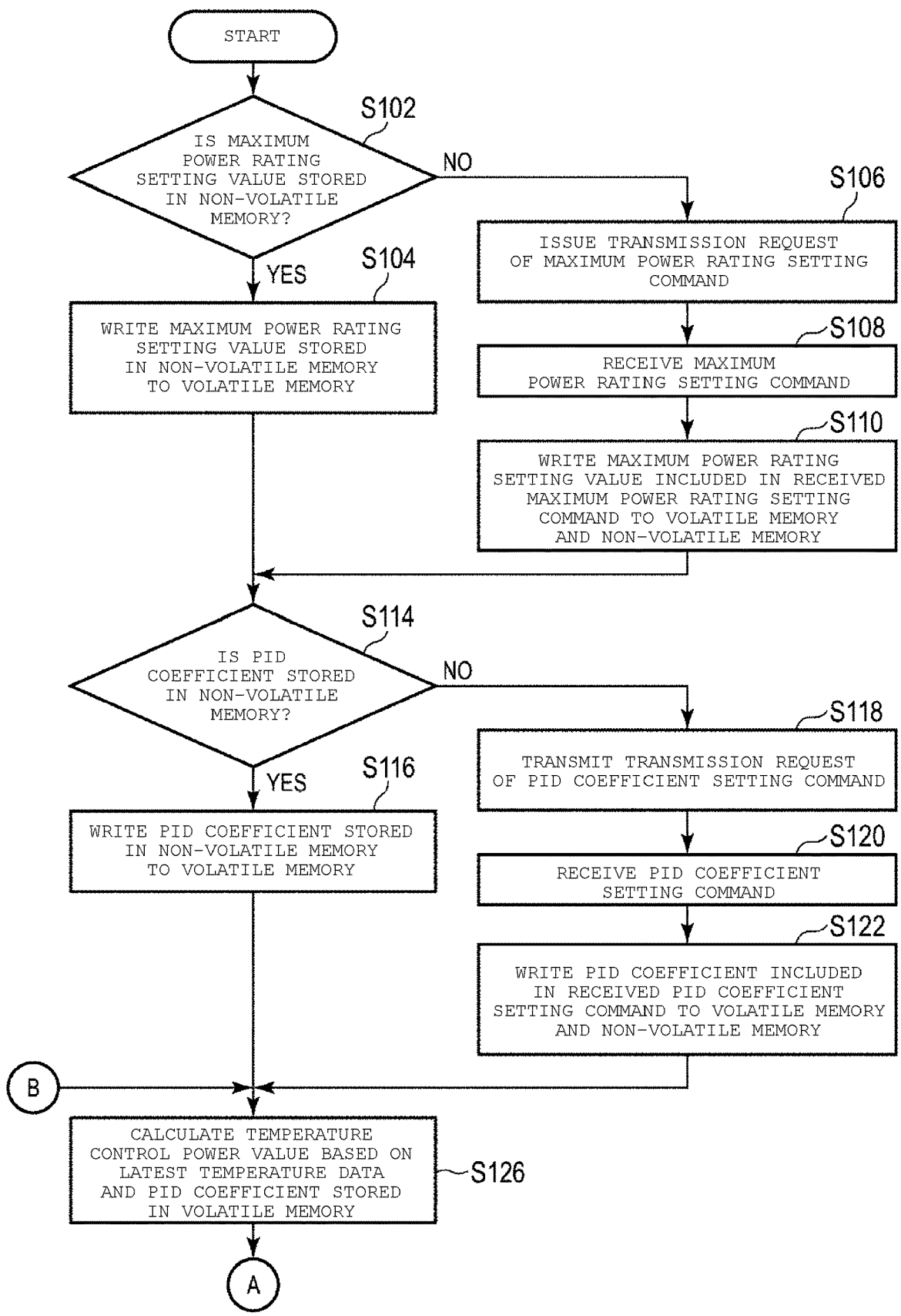
FIG. 18 is a flowchart of a first half of processing for switching an operation mode according to a fourth embodiment.
Figure 19:
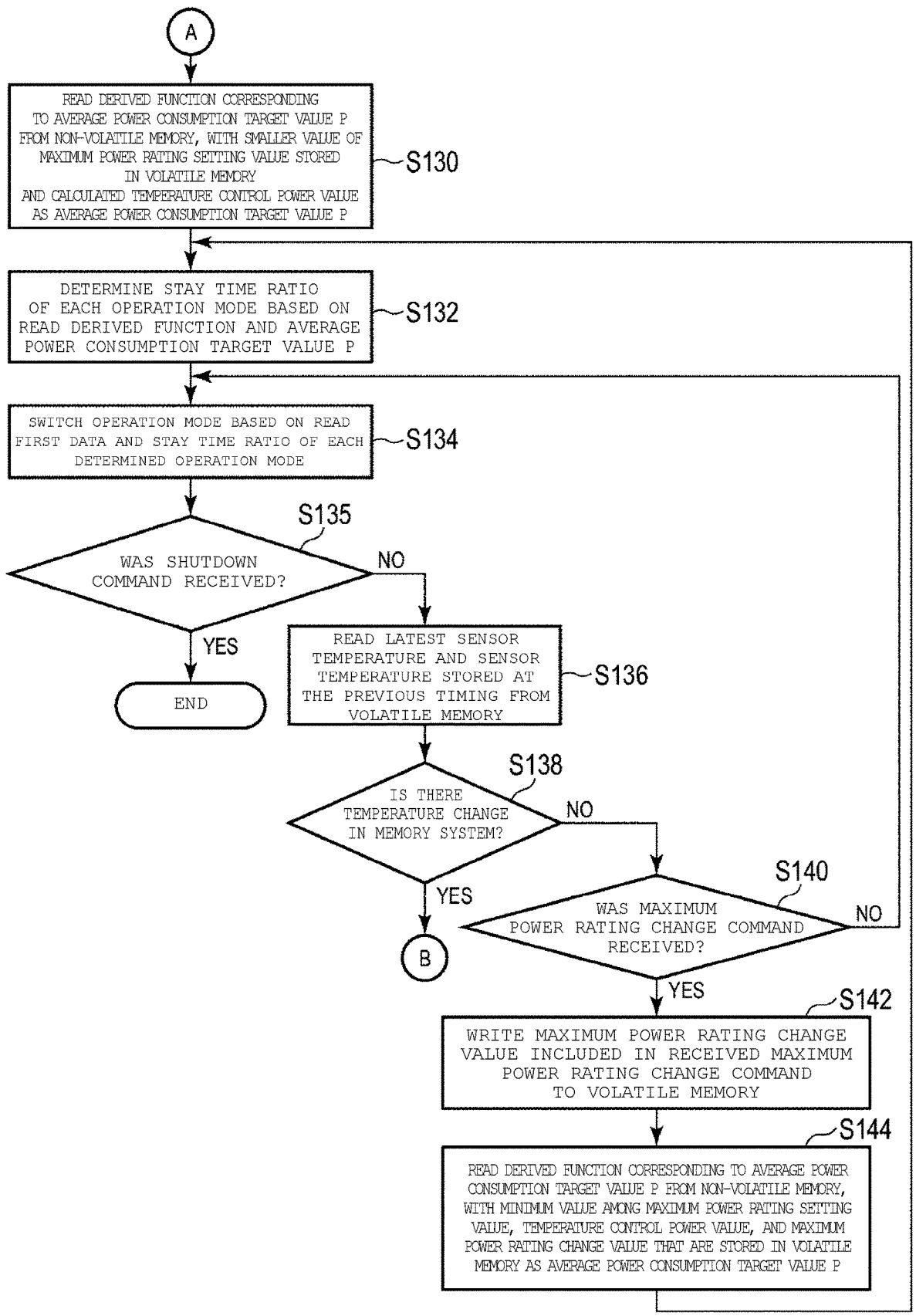
FIG. 19 is a flowchart of a latter half of processing for switching an operation mode according to a fourth embodiment.

FIG. 18 is a flowchart of a first half of processing performed by the operation mode control unit 60 to switch an operation mode according to the fourth embodiment. FIG. 19 is a flowchart of a latter half of processing performed by the operation mode control unit 60 to switch an operation mode according to the fourth embodiment.

When power is supplied to the memory system 20 and the CPU 56 starts up, the operation mode control unit 60 of the memory system 20 determines whether the maximum power rating setting value is stored in the non-volatile memory 40 (S102).

When the maximum power rating setting value is stored in the non-volatile memory 40 (YES in the S102), the operation mode control unit 60 writes the maximum power rating setting value stored in the non-volatile memory 40 to the volatile memory 58 (S104).

When the maximum power rating setting value is not stored in the non-volatile memory 40 (NO in the S102), the operation mode control unit 60 issues a transmission request of the maximum power rating setting command to the host 10 (S106). The host 10 transmits the maximum power rating setting command to the memory system 20 according to the transmission request of the maximum power rating setting command.

The memory system 20 receives the maximum power rating setting command (S108).

The operation mode control unit 60 of the memory system 20 writes the maximum power rating setting value included in the received maximum power rating setting command to the volatile memory 58 and the non-volatile memory 40 (S110).

After the processing of the S104 or the processing of the S110, the operation mode control unit 60 determines whether the PID coefficient is stored in the non-volatile memory 40 (S114).

When the PID coefficient is stored in the non-volatile memory 40 (YES in the S114), the operation mode control unit 60 writes the PID coefficient stored in the non-volatile memory 40 to the volatile memory 58 (S116).

When the PID coefficient is not stored in the non-volatile memory 40 (NO in the S114), the operation mode control unit 60 issues a transmission request of the PID coefficient setting command to the host 10 (S118). The host 10 transmits the PID coefficient setting command to the memory system 20 according to the transmission request of the PID coefficient setting command.

The memory system 20 receives the PID coefficient setting command (S120).

The operation mode control unit 60 of the memory system 20 writes the PID coefficient included in the received PID coefficient setting command to the volatile memory 58 and the non-volatile memory 40 (S122).

After the processing of the S116 or the S122, the operation mode control unit 60 calculates the temperature control power value based on the latest temperature data and the PID coefficient stored in the volatile memory 58 (S126). The temperature data represents a temperature in the memory system 20. The temperature data is periodically acquired and stored in advance in the volatile memory 58.

The operation mode control unit 60 reads a derived operating function corresponding to the average power consumption target value P from the non-volatile memory 40, with the smaller value of the maximum power rating setting value stored in the volatile memory 58 and the calculated temperature control power value as the average power consumption target value P (S130).

The operation mode control unit 60 determines the stay time ratio of each operation mode based on the read derived operating function and the average power consumption target value P (S132).

The operation mode control unit 60 reads first data from nonvolatile memory 40. The operation mode control unit 60 switches the operation mode based on the read first data and the stay time ratio of each determined operation mode (S134).

After the execution of the processing of the S134, the operation mode control unit 60 determines whether the memory system 20 received the shutdown command (S135). The processing of determining whether the shutdown command was received (S135) is not limited to being executed after the execution of the processing of switching the operation mode (S134), but may be executed after the execution of the processing shown in FIG. 17 (S104, S106, S108, S110, S116, S118, S120, S122, and S126), or after the execution of the processing (S130 and S132) shown in FIG. 18.

When the memory system 20 received the shutdown command (YES in the S135), the operation mode control unit 60 ends the operation mode switching processing (END).

When the memory system 20 does not receive the shutdown command (NO in the S135), the operation mode control unit 60 reads the latest sensor temperature and the sensor temperature stored at the previous timing from the volatile memory 58 (S136).

The operation mode control unit 60 determines whether there is a temperature change in the memory system 20 based on the difference between the read latest sensor temperature and the read sensor temperature stored at the previous timing (S138).

When there is a temperature change in the memory system 20 (YES in the S138), the operation mode control unit 60 calculates the temperature control power value based on the latest sensor temperature and the PID coefficient that are stored in the volatile memory 58 (S126).

When there is no temperature change in the memory system 20 (NO in the S138), the operation mode control unit 60 determines whether the memory system 20 received the maximum power rating change command (S140).

When the memory system 20 does not receive the maximum power rating change command (NO in the S140), the operation mode control unit 60 reads first data from non-volatile memory 40. The operation mode control unit 60 switches the operation mode based on the read first data and the stay time ratio of each determined operation mode (S134).

When the memory system 20 received the maximum power rating change command (YES in the S140), the operation mode control unit 60 writes the maximum power rating change value included in the received maximum power rating change command to the volatile memory 58 (S142).

The operation mode control unit 60 reads a derived operating function corresponding to the average power consumption target value P from the non-volatile memory 40, with the minimum value among the maximum power rating setting value, the temperature control power value, and the maximum power rating change value that are stored in the volatile memory 58 as the average power consumption target value P (S144).

The operation mode control unit 60 determines the stay time ratio of each operation mode based on the derived operating function and the average power consumption target value P (S132).

Figure 20:
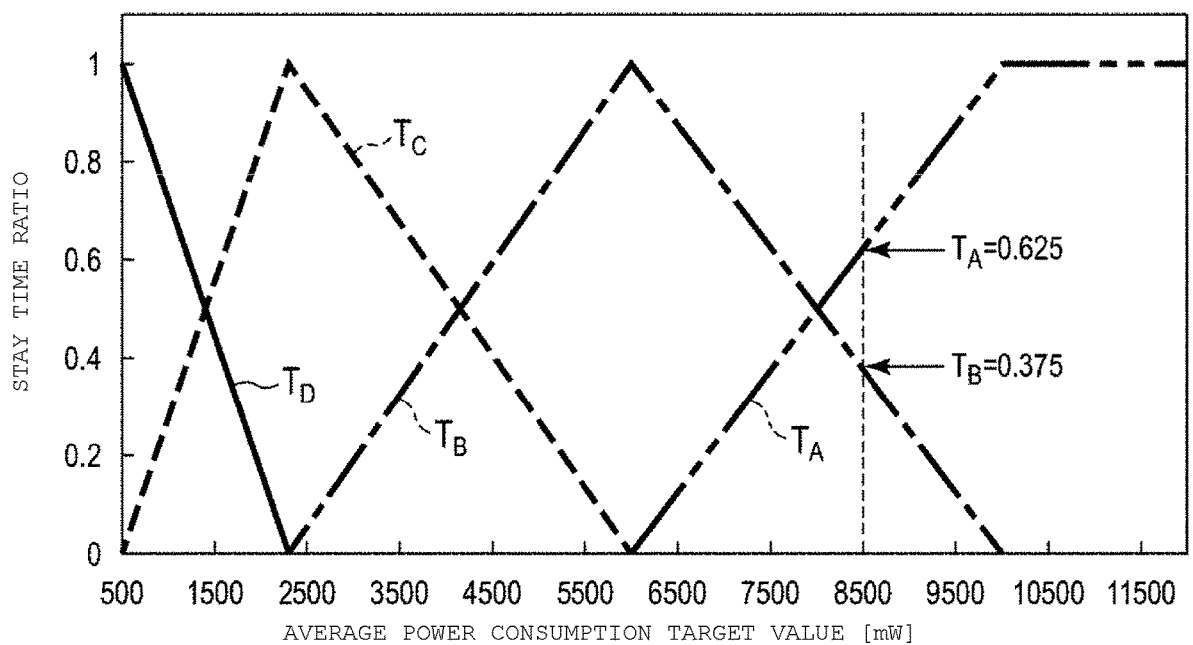
FIG. 20 depicts a graph of a stay time ratio of each operation mode according to a fourth embodiment.

FIG. 20 depicts a graph of the stay time ratio of each operation mode according to the fourth embodiment. For example, when the average power consumption target value P is 8,500 (mW), the operation mode control unit 60 can make the operation speed the fastest by switching to the operation modes A and B for execution. In the case, the stay time ratio $T_A$ of the operation mode A is 0.625. The stay time ratio $T_B$ of the operation mode B is 0.375.

Figure 21:
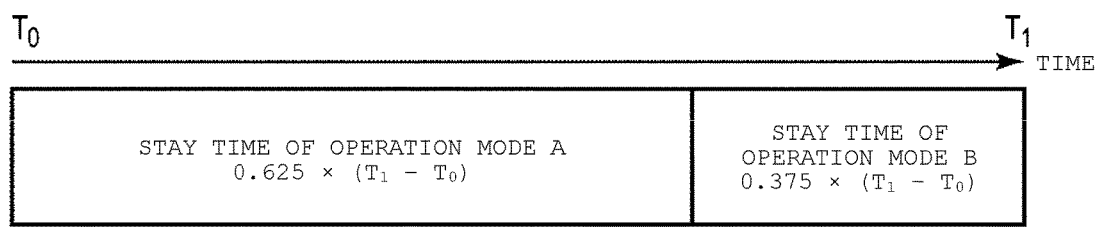
FIG. 21 is a diagram showing operation mode switching according to a fourth embodiment.

FIG. 21 is a diagram showing an example of operation mode switching according to the fourth embodiment. Within a fixed unit time ($T_0$–$T_1$), the stay time of the operation mode A is 0.625×($T_1$–$T_0$), and the stay time of the operation mode B is 0.375×($T_1$–$T_0$). The unit time may be determined in consideration of the specification of the circuit board characteristics of the memory system 20 and the characteristics of the circuit(s) thereon.

According to a fourth embodiment, the memory system 20 calculates the temperature control power value by using the switching control, the P control, the PI control, or the PID control. The memory system 20 determines the stay time ratios $T_A$, $T_B$, $T_C$, $T_D$ for each operation mode based on the average power consumption target value P, with the minimum value among the temperature control power value, the notified maximum power rating setting value, and the notified maximum power rating change value as the average power consumption target value P. Consequently, the average power consumption value of the memory system 20 is prevented from exceeding the power supply capacity of the host 10 and the temperature in the memory system 20 does not exceed the operation upper limit temperature.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to an external device that can supply power thereto, the memory system comprising:
    a non-volatile memory that stores data indicating a plurality of operation modes in association with different power consumption values; and
    a controller configured to:
        upon receipt of a first command indicating a first value of the power from the external device, determine a first ratio of execution times of the operation modes based on the first value, and
        control the non-volatile memory using the operation modes according to the determined first ratio.

2. The memory system according to claim 1, wherein the first value is a maximum value of the power that is suppliable to the memory system by the external device.

3. The memory system according to claim 2, wherein the controller is further configured to:
    upon receipt of a second command indicating a second value of the power from the external device, determine a second ratio of execution times of the operation modes based on the second value, and
    control the non-volatile memory using the operation modes according to the determined second ratio.

4. The memory system according to claim 1, wherein
    each of the power consumption values is an average value of power consumed by the memory system in the corresponding operation mode, and
    the controller is further configured to determine a target average power consumption value from the first value to select the operation modes.

5. The memory system according to claim 4, wherein
    the non-volatile memory stores derived operating functions each corresponding to a different range of average power consumption values,
    the controller is further configured to acquire from the non-volatile memory one of the derived operating functions corresponding to the determined target average power consumption value, and the first ratio is determined based on the acquired one of the derived operating functions and the determined target average power consumption value.

6. The memory system according to claim 1, further comprising:
    a sensor configured to measure a temperature in the memory system, wherein
    the controller is further configured to:
        determine a third value of maximum power that can be consumed by the memory system at the measured temperature,
        determine a third ratio of execution times of the operation modes based on the third value, and
        control the non-volatile memory using the operation modes according to the determined third ratio.

7. The memory system according to claim 6, wherein the controller determines the third value by performing proportional (P) control, proportional integral (PI) control, or proportional integral differential (PID) control in accordance with the measured temperature.

8. The memory system according to claim 7, wherein the controller is further configured to:
    acquire a proportional gain from the external device and perform the P control using the proportional gain,
    acquire a proportional gain and an integral gain from the external device and perform the PI control using the proportional gain and the integral gain, or
    acquire a proportional gain, an integral gain, and a differential gain from the external device, and perform the PID control using the proportional gain, the differential gain, and the integral gain.

9. The memory system according to claim 6, wherein the first value is either a maximum value of the power that is suppliable to the memory system by the external device or the third value, which is lower.

10. The memory system according to claim 1, wherein the command has a data structure confirming to NVMe or SAS standard.

11. An information processing system, comprising:
    an external device configured to supply power; and
    a memory system connectable to the external device and operable with the supplied power, the memory system including:
        a non-volatile memory that stores data indicating a plurality of operation modes in association with different power consumption values, and
        a controller configured to:
            upon receipt of a first command indicating a first value of the power from the external device,
            determine a first ratio of execution times of the operation modes, and
            control the non-volatile memory using the operation modes according to the determined first ratio.

12. The information processing system according to claim 11, wherein the first value is a maximum value of the power that is suppliable to the memory system by the external device.

13. The information processing system according to claim 12, wherein the controller is further configured to:
    upon receipt of a second command indicating a second value of the power from the external device, determine a second ratio of execution times of the operation modes based on the second value, and
    control the non-volatile memory using the operation modes according to the determined second ratio.

14. The information processing system according to claim 11, wherein each of the power consumption values is an average value of power consumed by the memory system in the corresponding operation mode, and the controller is further configured to determine a target average power consumption value from the first value to select the operation modes.

15. The information processing system according to claim 14, wherein the non-volatile memory stores derived operating functions each corresponding to a different range of average power consumption values, the controller is further configured to acquire from the non-volatile memory one of the derived operating functions corresponding to the determined target average power consumption value, and the first ratio is determined based on the acquired one of the derived operating functions and the determined target average power consumption value.

16. The information processing system according to claim 11, further comprising:

a sensor configured to measure a temperature in the memory system, wherein the controller is further configured to:
determine a third value of maximum power that can be consumed by the memory system at the measured temperature,
determine a third ratio of execution times of the operation modes based on the third value, and
control the non-volatile memory using the operation modes according to the determined third ratio.

17. The information processing system according to claim 16, wherein the controller determines the third value by performing proportional (P) control, proportional integral (PI) control, or proportional integral differential (PID) control in accordance with the measured temperature.

18. The information processing system according to claim 17, wherein the controller is further configured to:

acquire a proportional gain from the external device and perform the P control using the proportional gain, acquire a proportional gain and an integral gain from the external device and perform the PI control using the proportional gain and the integral gain, or acquire a proportional gain, an integral gain, and a differential gain from the external device, and perform the PID using the proportional gain, the differential gain, and the integral gain.

19. The information processing system according to claim 16, wherein the first value is either a value of the power that is suppliable to the memory system by the external device or the third value, whichever is lower.

20. A method performed by a memory system connectable to an external device that can supply power thereto, the method comprising:

storing in a non-volatile memory data indicating a plurality of operation modes in association with different power consumption values;

upon receipt of a first command indicating a first value of the power from the external device, determining a first ratio of execution times of the operation modes; and controlling the non-volatile memory using the operation modes according to the determined first ratio.

* * * * *